(12) United States Patent
Ginesi et al.

(10) Patent No.: US 6,981,186 B2
(45) Date of Patent: Dec. 27, 2005

(54) LOOP DIAGNOSTIC MODE FOR ADSL MODEMS

(75) Inventors: Alberto Ginesi, Noordwijk (NL); Scott McClennon, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 399 days.

(21) Appl. No.: 10/209,104

(22) Filed: Jul. 30, 2002

(65) Prior Publication Data

US 2003/0063711 A1 Apr. 3, 2003

(30) Foreign Application Priority Data

Jul. 30, 2001 (CA) .................................. 2354298

(51) Int. Cl.$^7$ ........................................... G01R 31/28
(52) U.S. Cl. ..................... 714/717; 714/716
(58) Field of Search ............................. 375/222, 225, 375/227, 219; 370/241; 714/712, 716, 717; 702/183

(56) References Cited

U.S. PATENT DOCUMENTS

| | | | |
|---|---|---|---|
| 5,999,540 A | 12/1999 | McGhee | |
| 6,064,692 A | 5/2000 | Chow | |
| 6,292,539 B1 * | 9/2001 | Eichen et al. | 379/1.04 |
| 6,310,909 B1 | 10/2001 | Jones | |
| 6,389,065 B1 | 5/2002 | McGhee | |
| 6,456,694 B1 * | 9/2002 | Posthuma | 379/1.04 |
| 6,658,052 B2 * | 12/2003 | Krinsky et al. | 375/222 |
| 6,725,176 B1 * | 4/2004 | Long et al. | 702/183 |
| 6,885,696 B2 * | 4/2005 | Wingrove | 375/219 |

* cited by examiner

*Primary Examiner*—David Ton
(74) *Attorney, Agent, or Firm*—Merek, Blackmon & Voorhees, LLC

(57) ABSTRACT

A method for establishing communication in an ADSL subscriber loop, the method comprising the steps of determining that showtime cannot be entered during initialization of communication between the modems; requesting entry into a diagnostic mode by one of the modems upon the determining; diagnosing line conditions as being unable to support communication at a predetermined standard; and establishing communication at a standard lower than the predetermined standard.

14 Claims, 2 Drawing Sheets

LOOP DIAGNOSTIC MODE FOR ADSL MODEMS

BACKGROUND OF THE INVENTION

The present invention relates to a system and method for diagnosing errors on asymmetric digital subscriber line (ADSL) subscriber loops, wherein a successful connection cannot be achieved.

Remote access and retrieval of data is becoming increasingly popular in data communication. The proliferation of the Internet has provided a vast network of information that is available to the general public. As the Internet grows and technology advances, this information is becoming increasingly voluminous and the details are become increasingly intricate. What used to comprise mainly text information has grown to include still and moving images as well as sound. The increase in the volume of information to be transferred has presented a need for a high-speed Internet connection, since traditional telephone modems communicate at speeds to slow for efficient communication.

One proposal for high-speed communication is the introduction of Digital Subscriber Line (DSL) technology. One of the most attractive features of DSL is that it is implemented using an infrastructure that already exists. DSL shares copper twisted pair lines typically used for telephone communication. However, only a small portion of the available bandwidth of the twisted pair line (0 to 4 kHz) is used for Plain Old Telephone Service (POTS). DSL takes advantage of the available frequency spectrum from 4 kHz to approximately 1.1 MHz for transmitting data.

Asymmetric DSL (ADSL) is currently the most practical form of DSL technology, and therefore the most widely implemented. ADSL is asymmetric in that its downstream (to a subscriber) capacity is larger than its upstream (from the subscriber) capacity. Typically, a Discrete Multi-tone (DMT) scheme is used. The spectrum from 4 kHz to 1.1 MHz is divided into 256 sub-channels, or tones, each having a bandwidth of 4.3125 kHz. Each sub-channel uses Quadrature Amplitude Modulation (QAM) to carry 2 to 15 bits/QAM symbol.

In accordance with ADSL standard ITU G.992.2, several phases occur in order to initialize a communication link. These phases include handshaking, transceiver training, channel analysis and exchange.

Handshaking is used for determining the nature and capabilities of communication endpoints (such as an ADSL modem) and for indicating which protocol will be used for the remainder of the initialization. The ADSL modem, or termination unit, at a central office is referred to as an ATU-C. Similarly, the ADSL termination unit at the subscriber, or remote location, is referred to as the ATU-R.

The signalling method used for the handshake interchange is designed to be robust. Biphase shift keying (BPSK) modulation is often used to modulate multiple single-tone sub-carriers, all carrying the same data. Typically, the ATU-C and ATU-R exchange a message containing information about the endpoint type, frequency range, and number of DMT sub-carriers supported.

During transceiver training, the transceivers at each end of the line acquire a DMT symbol stream, adjust receiver gain, perform symbol-timing recovery, and train any equalizers. There is an optional echo cancellation training step that can also be performed during this phase.

During channel analysis, the transceivers exchange capability information and perform detailed channel characterization. Both the ATU-R and ATU-C attempt to measure specific channel characteristics such as unusable sub-carriers, loop attenuation on a per sub-carrier basis, SNRs, and any other channel impairments that would affect the potential transmitted bit rates. Based on the discovered channel characteristics, the ATU-C makes the first offer of the overall bit rates and coding overhead that will be used for the connection.

The exchange phase sets the final overall transmission rates in both the upstream and downstream directions for the connection. These final rates are determined based on calculated channel parameters measured during the channel analysis phase, and are not necessarily the same as the preliminary rates offered during that phase.

Furthermore, the exchange phase sets forward error correction (FEC) and interleaver configurations. Generally, the configurations are close to the optimum bit rate for the channels. Four carriers are used to modulate the bits of the messages, each carrier being loaded with 2 bits using quadrature phase shift key (QPSK) modulation.

Since the ATU-C controls data rates, if the ATU-R cannot support any of the offered rates, both terminals will return to the beginning of the initialization process. Otherwise the ATU-R responds with the rate it can support.

However, sometimes the transceivers may not be capable of successfully reaching a data transfer stage, referred to as SHOWTIME, due to poor channel conditions. In this case there is a need for a system to be able to diagnose the problems preventing the transceivers from initializing so that they can be corrected or avoided.

It is an object of the present invention to obviate or mitigate at least some of the above mentioned disadvantages.

SUMMARY OF THE INVENTION

In accordance with an aspect of the present invention, there is provided a procedure for exchanging diagnostic information between an ATU-R an the ATU-C when line conditions are too poor for the modems to initialize in a standard compliant manner.

It is an advantage of the present invention that the transceivers are able to exchange diagnostic information during training.

It is a further advantage of the present invention that the measured diagnostic information can be exchanged reliably, even in poor channel conditions.

In accordance with another aspect of the invention there is provided a method for establishing communication in an ADSL subscriber loop, the method comprising the steps of determining that showtime cannot be entered during initialisation of communication between the modems; requesting entry into a diagnostic mode by one of the modems upon the determining; diagnosing line conditions as being unable to support communication at a predetermined standard; and establishing communication at a standard lower than the predetermined standard.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
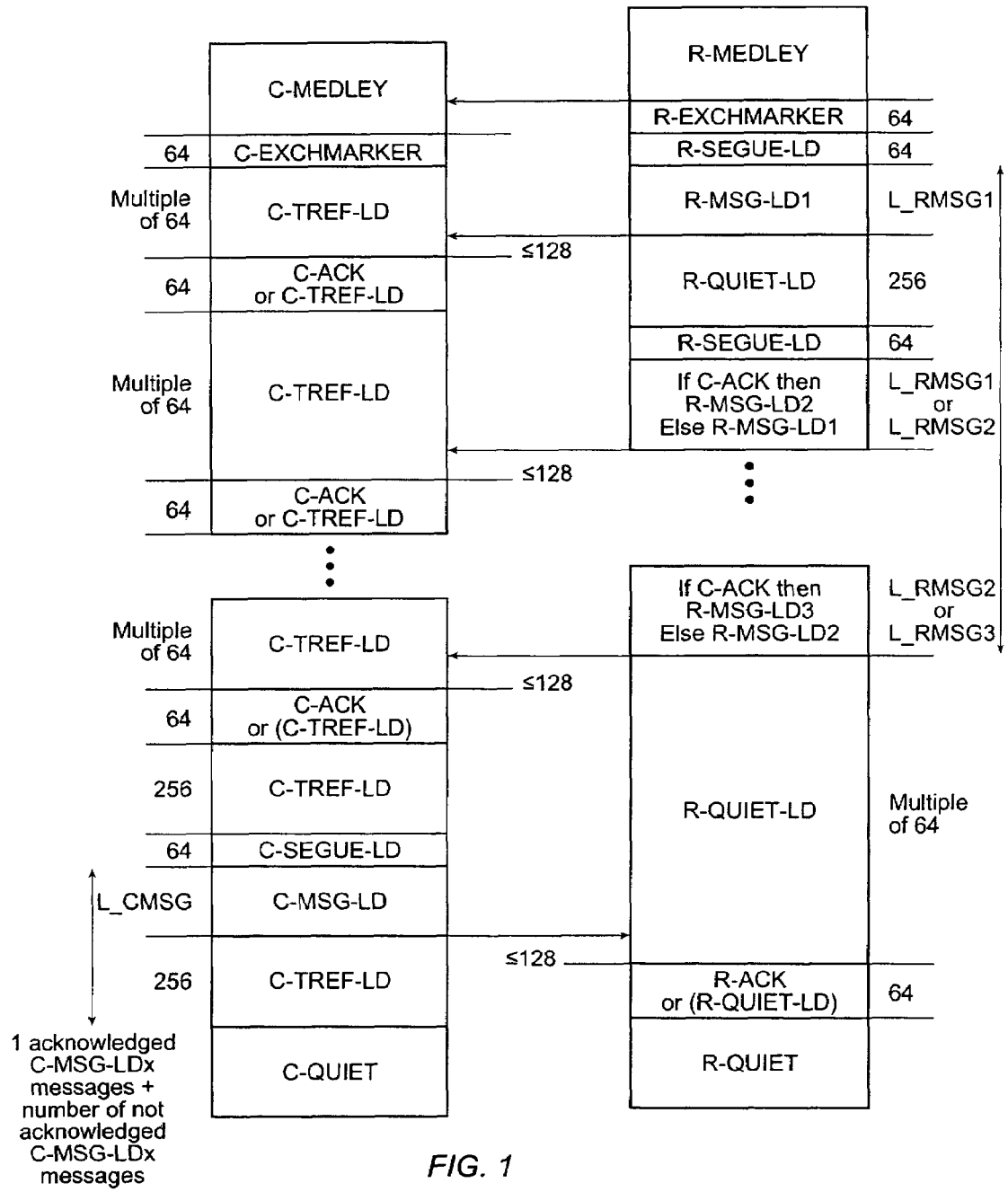
FIG. 1 is loop diagnostic timing diagram.

For convenience, like numerals in the description refer to like structures in the drawings. Referring to FIG. 1, a loop diagnostic timing diagram is illustrated. The timing diagram is illustrated with two columns. A first column represents signals transmitted from the ATU-C. A second column represents signals transmitted from the ATU-R. Time is represent vertically and progresses from the top of the columns to the bottom.

During Initialization, if it is determined that SHOWTIME cannot be entered satisfactorily, either the ATU-C or the ATU-R requests entry into a diagnostic mode. Once a request to enter diagnostic mode is made, the transceivers proceed to repeat a normal Initialization. However, after a signal-to-noise ratio SNR measurement is performed, the transceivers enter into a diagnostic link mode. In current standards, the SNR is determined during C-MEDLEY and R-MEDLEY, and the diagnostic mode is entered after C-EX-CHMARKER and R-EXCHMARKER, which immediately follow the MEDLEY states. During the diagnostic states, channel information that has been gathered during previous Initialization states are exchanged.

During the loop diagnostic sequence of states, a counter that is typically initialized at the start of the-MEDLEY states is kept counting. The counter is used to fix the size of the state transitions. Preferably, any state transition occurs at multiples of 64 of the counter value.

Further, it is preferable that the messages conveying channel information use a 1/8 bit/DMT modulation, where a "1" is encoded as eight consecutive REVERB symbols while a "0" is encoded as eight consecutive SEGUE symbols. REVERB and SEGUE symbols are defined in current standards. Alternately, it is possible that a "0" is encoded as eight consecutive REVERB symbols while a "1" is encoded as eight consecutive SEGUE symbols. 64 SEGUE symbols, referred to as C-SEGUE-LD or R-SEGUE-LD, are defined as a time marker and precede a message.

It is preferable that the diagnostic mode is very robust; or at least as robust as the G.hs signaling technique. It is for this reason, that the REVERB and SEGUE messaging is used together with 8 symbols repeat technique. During both REVERB and SEGUE, a periodic multi-tone signal is transmitted across the loop. Since the signal is periodic, the effects of inter-symbol interference ISI and inter-channel interference ICI are greatly reduced and the effect of timing jitter on performance is improved. Also, time diversity can be exploited to further improve performance, either by averaging the repeated symbols prior to demodulation or using majority selection on the demodulated frames that nominally contain the same data.

Messaging between the ATU-C and ATU-R is half-duplex in order to reduce the effect of echo on performance. This is preferable since echo-cancellers will not be able to train properly due to bad channel conditions.

A corrupted received message does not trigger an Initialization reset procedure, since there is no benefit in going back to handshaking. On channels with poor signal to noise ratio (SNR) a second Initialization has a relatively high chance of failing with the consequence that loop diagnostic would be further delayed and there is a potential for the process to degenerate into an infinite loop condition. Therefore, the messaging protocol is designed as a "repeat/request" technique, for which a certain number of attempts are made to properly convey a message. The specific number can be set by a vendor and is implementation dependent.

The duration of the states during Channel Discovery, Transceiver Training and Channel Analysis of the loop diagnostics procedure is fixed. That is, a state transition on one end does not rely upon the detection of a state transition on the far end. This makes the procedure much more robust that relying on state detection at another end of the loop, especially when the loop condition is poor.

A message is allowed to be longer in the upstream direction than in the downstream direction, where the channel conditions are typically better. It is often possible to provide an upstream message that is between two and three times longer than a downstream message.

Further, for debugging purposes, during the loop diagnostic procedure a message communicating the reason why the last Initialization in normal mode failed is exchanged. In one embodiment, this message is exchanged during C-MSG1 and R-MSG1 of the Initialization procedure instead of the standard message. Alternately, this message is exchanged with other messages, as will be described is detail later in the description. This message further includes an index of the last state that was successfully reached during the last Initialization procedure. This helps discriminate between failures due to bad loop conditions and failures due to other reasons, such as interoperability issues for example. Some examples of possible failures and corresponding message codes include:

a) Failed—Cause: Insufficient Capacity "00010001";
b) Failed—Cause: CRC error in one of the received messages "00100010";
c) Failed—Cause: Time outs "01000100";
d) Failed—Cause: Unexpected received message content "10001000";
e) Failed—Cause: Unknown "00000000"; and
f) Successful "11111111".

In the example illustrated in FIG. 1, three different messages are sent by the ATU-R. These messages are referred to as R-MSG-LD1, R-MSG-LD2 and R-MSG-LD3. Only one message, C-MSG-LD, is sent by the ATU-C. The number of messages has been selected for ease of illustration only, as will be appreciated by a person skilled in the art.

Figure 2:
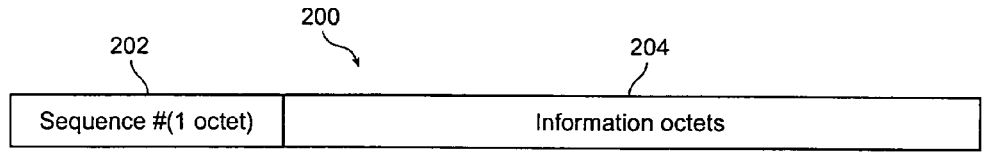
FIG. 2 is a schematic diagram of a message format.

Referring to FIG. 2, a format for the messages listed above is illustrated generally by numeral 200. The message comprises a sequence number field 202 and a body 204. For the upstream direction, that is data sent from the ATU-R, the sequence number field indicates which of the three messages is being sent. The first message R-MSG-LD1 is identified by "00010001" shall indicate, the second message R-MSG-LD2 is identified by "00100010", and the third message R-MSG-LD3 is identified by "01000100". There is only one message sent downstream C-MSG-LD1, and its sequence number is set to "00010001". As illustrated by the various sequence field numbers, a portion identifies the direction of the data, that is upstream or downstream, and a portion identifies the message number.

Figure 3:
FIG. 3 is a schematic diagram of a channel attenuation message.

In the present embodiment, the information fields of the different messages are defined as follows. Referring to FIG. 3, data fields for the first message R-MSG-LD1 are illustrated generally by numeral 300. The data in the first message represents the channel attenuation of the loop. Channel attenuation (ATN) is an estimate of the channel transfer function referred to tip and ring. Any receive gain and filter is removed from the estimate. Any spectral shaping applied at the transmitter is also taken into account by subtracting it from the estimate. The ATN is provided for each of the number of downstream channels Nds. One octet is used to represent each ATN(i), with its decimal value ATN(i), i=0, 1, . . . , Nds-1, representing the attenuation as a multiple of 0.5 dB. That is, the channel attenuation in dB for bin i is ATN(i)*0.5. An ATN(i) value of 255 is reserved to indicate that a channel attenuation estimate is not available for that bin.

Figure 4:
FIG. 4 is a schematic diagram of a quiet line noise power spectral density message.

Referring to FIG. 4, data fields for the second message R-MSG-LD2 are illustrated generally by numeral 400. The data in the second message represents the quiet line noise power spectral density (PSD) of the loop. Quiet Line Noise PSD (NSD) is an estimate of the quiet line noise PSD referred to tip and ring. Any receive gain and filter shall be removed from the estimate. One octet is used to represent each NSD(i), with its decimal value NSD(i), i=0, 1, . . . , Nds-1, representing the NSD in multiples of −1 dBm/Hz. That is, the NSD for bin i is −NSD(i) dBm/Hz. An NSD(i) value of 255 is reserved to indicate that the noise PSD estimate is not available for that bin.

Figure 5:
FIG. 5 is a schematic diagram of a signal to noise ratio message.

Referring to FIG. 5, data fields for the third message R-MSG-LD3 are illustrated generally by numeral 500. The data in the third message represents the signal to noise ratio (SNR) of the loop. The SNR represents as estimate of the Signal-to-Noise ratio as measured during the MEDLEY state. One octet is used to represent each SNR(i), with its decimal value SNR(i), i=0, 1, . . . , Nds-1, representing the SNR in multiples of 0.5 dB. That is, the SNR for bin i is 0.5*SNR(i) dB. An SNR(i) value of 255 is reserved to indicate that the channel attenuation estimate is not available for that bin.

Figure 6:
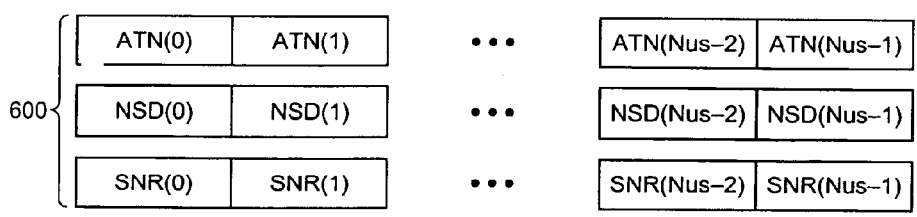
FIG. 6 is a schematic diagram of a message combining all the parameters of FIGS. 3–5.

Referring to FIG. 6, data fields for the downstream message C-MSG-LD1 are illustrated generally by numeral 600. The data in the upstream messages represent the ATN, NSD, and SNR of the loop. There are 3 upstream and one downstream messages, as discussed above regarding FIG. 1.

Generally, a 16-bit cyclic redundancy check (CRC) is appended to the message and is computed the same way as the CRC for a C/R-MSG1 signal used in the current standards. The same modulation technique as the one used for the message shall be used to transmit the 16-bit CRC.

The parameters described above, those are the ATN, NSD, and SNR, are the preferable minimum parameters that should be transmitted for the diagnostics to be considered useful. Further it is preferred that an additional parameter, that is the attainable data rate (ATTNDR), is also transmitted. If the ATTNDR is not transmitted, it can typically be estimated from the other parameters. However, such an estimate is not always accurate and thus it is preferred to transmit the ATTNDR as well. While the transmission of the ATTNDR is not described it detail herein, it and other parameter's transmission will be apparent to a person skilled in the art.

Referring once again to FIG. 1, the operation of the current embodiment is described as follows. Once the transceivers enter diagnostic mode, the ATU-C transmits a filler signal C-TREF-LD, which is the same as C-TREF1 in the current standard, which is a symbol that contains a single tone. The filler signal C-TREF-LD lasts for a predefined period of time, which is preferably a multiple of 64. During this time, the ATU-R transmits the R-SEGUE-LD signal, which prefaces a message signal, and then the message signal itself, R-MSG-LD1. The ATU-R then transmits a filler signal R-QUIET-LD.

Once the message R-MSG-LD1 is received, the ATU-C acknowledges the message using C-ACK. In the present embodiment, the acknowledgement message C-ACK is represented by as "01010101" and is transmitted using the same 1/8 bit/symbol modulation technique as that used for the messages. If the ATU-C does not recognize or receive the message, it continues to transmit its filler signal C-TREF-LD. If the ATU-R does not receive the acknowledgement signal C-ACK within a predefined time period, it retransmits the first message R-MSG-LD1 by retransmitting R-SEGUE-LD and then first message R-MSG-LD1.

Further it is possible that the ATU-C transmits the acknowledgement signal C-ACK, but the ATU-R does not receive it. The ATU-R retransmits the first message R-MSG-LD1 as described above. The ATU-C receives the message and, parsing the identifier, determines that the message has already been received. The ATU-C notes the message was repeated and retransmits the acknowledgement signal C-ACK. If a predefined number of attempts to transmit the message R-MSG-LD1 all fail, then the process is aborted. The predefined number is defined by the vendor.

If the ATU-R receives the acknowledgement signal C-ACK, it transmits the second message R-MSG-LD2, by transmitting R-SEGUE-LD and then the second message R-MSG-LD2. A similar procedure is followed for the second and third messages as it is for the first message.

After sending the last acknowledgement message C-ACK in response to the third message R-MSG-LD3 message, the ATU-C sends at least 256 symbols of C-TREF-LD. The ATU-R is programmed to send the three messages ATN, NSD and SNR as outlined above. It only repeats if it does not receive the C-ACK If an R-SEGUE-LD state is detected, this is an indication that the ACK message was corrupted and the ATU-R has transmitted R-MSG-LD3 again.

However, the ATU-R begins to send a filler signal, which in the present embodiment is R-QUIET-LD, or no signal, once the last acknowledgement signal C-ACK is received. Thus, if The ATU-C does not detect an R-SEGUE-LD state within the timeframe, the ATU-C sends a C-SEGUE-LD state and its message C-MSG-LD1. A similar sequence of states to that when the ATU-R was transmitting the message follows.

Similar conditions apply to the last acknowledgement message R-ACK received from the ATU-R than to the last acknowledgement message C-ACK received from the ATU-C. After sending the acknowledgement message R-ACK in response to the last C-MSG-LD1 message, the ATU-R sends at least 256 symbols of R-QUIET-LD. If no C-SEGUE-LD state is detected within this timeframe the ATU-R assumes that the loop diagnostic procedure is terminated and enter the R-QUIET state.

The procedure can also be used in the reverse direction from the ATU-C to the ATU-R to communicate the ATN, NSD and SNR values at the ATU-C, with all the messages reversed.

Although the invention has been described with reference to certain specific embodiments, various modifications thereof will be apparent to those skilled in the art without departing from the spirit and scope of the invention as outlined in the claims appended hereto.

What is claimed is:

1. A method for establishing communication in an ADSL subscriber loop, said method comprising the steps of:
  (a) determining that showtime cannot be entered during initialization of communication between an ATU-R and an ATU-C;

(b) requesting entry into a diagnostic mode by one of said ATU-R and said ATU-C upon said determining;

(c) diagnosing line conditions as being unable to support communication at a predetermined standard; and (d) establishing communication at a standard lower than said predetermined standard;

wherein during a loop diagnostic sequence of states, a counter is incremented, and further wherein said counter is used to fix a size of state transitions.

2. A method as defined in claim 1, said ATU-R and said ATU-C exchanging diagnostic information during said diagnostic mode.

3. A method as defined in claim 1, said line conditions being a predetermined signal to noise ratio.

4. A method for establishing communication comprising the steps of:

(a) performing initialization between a first transceiver and a second transceiver;

(b) detecting showtime failure between said first transceiver and second transceivers;

(c) requesting entry into diagnostic mode;

(d) repeating initialization between said first and second transceivers;

(e) performing signal to noise ratio measurement;

(f) exchanging channel information between said first and second transceivers; and (g) establishing communications, between said first and second transceivers at a data transmission standard lower than the predefined rate;

wherein during a loop diagnostic sequence of states, a counter is incremented, and further wherein said counter is used to fix a size of state transitions.

5. The method of claim 4, wherein the diagnostic mode is at least as robust as the G.hs signaling technique.

6. The method of claim 5, wherein REVERB and SEGUE messaging is used together with an 8 symbol repeat technique, and a periodic multi-tone signal is transmitted across a loop between said first and second transceivers.

7. The method of claim 4, wherein messaging between the first transceiver and second transceiver is half-duplex.

8. The method of claim 4, wherein a messaging protocol used in said diagnostic mode is a repeat/request technique, for which a predetermined number of attempts are made to convey a message.

9. The method of claim 4, wherein a duration of states during channel discovery, transceiver training and channel analysis of the loop diagnostic mode is fixed.

10. The method of claim 4, wherein a message is allowed to be longer in an upstream direction than in a downstream direction.

11. The method of claim 4, wherein during the diagnostic mode a message relating to initialization failure in normal mode, is exchanged between the first and second transceivers.

12. The method of claim 4, wherein during the diagnostic mode, information including at least one of: channel attenuation (ATN), quiet line noise power spectrum density (NSD), signal to noise ratio (SNR) and attainable data rate (ATTNDR) are transmitted.

13. The method of claim 4, wherein there are at least 3 upstream and 1 downstream messages defined for use in said diagnostic mode.

14. The method of claim 13, wherein a 16-bit CRC can be appended to the messages.

* * * * *